(12) United States Patent
Kurihara

(10) Patent No.: US 7,053,906 B2
(45) Date of Patent: May 30, 2006

(54) TEXTURE MAPPING METHOD, RECORDING MEDIUM, PROGRAM, AND PROGRAM EXECUTING APPARATUS

(75) Inventor: Shigeru Kurihara, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/799,646

(22) Filed: Mar. 5, 2001

(65) Prior Publication Data

US 2001/0020947 A1  Sep. 13, 2001

(30) Foreign Application Priority Data

Mar. 8, 2000 (JP) ............... 2000-064226

(51) Int. Cl.
*G09G 5/00* (2006.01)
*G06T 15/00* (2006.01)

(52) U.S. Cl. ............ 345/582; 345/581; 345/419; 345/428; 345/587; 382/285

(58) Field of Classification Search ........ 345/418–421, 345/423, 426, 427–428, 581–585, 587–589, 345/593, 597, 619, 624, 620, 623, 630; 382/285
See application file for complete search history.

(56) References Cited

U.S. PATENT DOCUMENTS

| | | | |
|---|---|---|---|
| 4,342,454 A | 8/1982 | Baer et al. | |
| 4,970,666 A * | 11/1990 | Welsh et al. | ................. 345/423 |
| 5,395,242 A | 3/1995 | Slye et al. | |
| 5,507,485 A | 4/1996 | Fisher | |
| 5,558,339 A | 9/1996 | Perlman | |
| 5,687,307 A | 11/1997 | Akisada et al. | |
| 5,740,344 A | 4/1998 | Lin et al. | |
| 5,779,548 A | 7/1998 | Asai et al. | |
| 5,793,371 A | 8/1998 | Deering | |
| 5,802,531 A * | 9/1998 | Lamiraux et al. | ........... 715/514 |
| 5,835,096 A * | 11/1998 | Baldwin | ..................... 345/582 |
| 5,982,378 A * | 11/1999 | Kato | ......................... 345/582 |
| 5,999,185 A | 12/1999 | Kato et al. | |
| 6,009,190 A | 12/1999 | Szeliski et al. | |
| 6,118,452 A * | 9/2000 | Gannett | ...................... 345/418 |
| 6,141,725 A * | 10/2000 | Tucker et al. | ............... 711/100 |
| 6,146,143 A | 11/2000 | Huston et al. | |
| 6,215,500 B1 | 4/2001 | Deering | |

(Continued)

FOREIGN PATENT DOCUMENTS

JP  5-282279 A  10/1993

(Continued)

OTHER PUBLICATIONS

European Patent Office; "European Search Report" issued over corresponding European Patent Application EP 01 30 2134; dated Sep. 8, 2003; pp. 1-3.

(Continued)

*Primary Examiner*—Matthew C. Bella
*Assistant Examiner*—Wesner Sajous
(74) *Attorney, Agent, or Firm*—Fitch, Even, Tabin & Flannery

(57) ABSTRACT

A method of simply mapping a texture such as a light point texture onto a three-dimensional model comprises the steps of designating a three-dimensional model having polygons to be subjected to a texture mapping process, designating a texture used for the texture mapping process, and transforming the polygons by perspective transformation and performing the texture mapping process by mapping the designated texture onto respective vertices of the transformed polygons.

12 Claims, 12 Drawing Sheets

U.S. PATENT DOCUMENTS

| | | | |
|---|---|---|---|
| 6,222,551 B1 * | 4/2001 | Schneider et al. | 345/419 |
| 6,231,443 B1 | 5/2001 | Asai et al. | |
| 6,256,041 B1 | 7/2001 | Deering | |
| 6,280,323 B1 | 8/2001 | Yamazaki et al. | |
| 6,289,299 B1 * | 9/2001 | Daniel et al. | 703/21 |
| 6,359,629 B1 * | 3/2002 | Hopcroft et al. | 345/423 |
| 6,389,504 B1 * | 5/2002 | Tucker et al. | 711/100 |
| 6,677,956 B1 * | 1/2004 | Raskar et al. | 345/581 |
| 2001/0023201 A1 | 9/2001 | Takatsuka et al. | |
| 2002/0015040 A1 | 2/2002 | Takatsuka et al. | |
| 2004/0174357 A1 * | 9/2004 | Cheung et al. | 345/419 |

FOREIGN PATENT DOCUMENTS

| | | |
|---|---|---|
| JP | 8-083352 A | 3/1996 |
| JP | 11-073527 A | 3/1999 |

OTHER PUBLICATIONS

Japanese Patent Office; Office Action Mailing No. 139871; Mailing Date May 14, 2002 (partial translation of pertinent portions included).

FantaVision; "Impressions, screens, and movies of the righteous multiplayer mode in SCEA's PS2 launch puzzler"; PlayStation 2: FantaVision [online]; Oct. 18, 2000; Retrieved from the Internet on <URL: http://ps2.ign.com/articles/133/133857p1.html>, pp. 1-3; Retrieved from the Internet on Mar. 31, 2003.

Fantavision FAQ/Guide/Whatever [online]; Aug. 20, 2000; Retrieved from the Internet on <URL: http://db.gamefaqs.com/console/ps2/file/fantavision.txt>, pp. 1-5; Retrieved from the Internet on Mar. 31, 2003.

FantaVision Import Review; "This quirky little variation on Missile Command is one of the PS2's best games"; PlayStation 2: FantaVision [online]; May 1, 2000; Retrieved from the Internet on <URL: http://ps2.ign.com/articles/078/078707p1.html>, pp. 1-2; Retrieved from the Internet on Mar. 31, 2003.

"Weekly Famitsu"; Fantavision; ASCII, No. 584; Feb. 25, 2000; p. 22-23, 25 (with 7-page full English translation included).

"Fantavision"; Instruction Manual; Playback of Replay Data and Normal Replay Mode; date unknown; p. 26-29 (with 3-page full English translation included).

"Fantavision: The rockets' red glare, the bombs bursting in air . . . Only in Japan?"; http://www.maxpages.com/ffonoline/Fantavision ; Feb. 17, 2000; p. 1.

Yukiyoshi Ike Sato, New Look: Playstation 2 Fantavision, Retrieved Oct. 3, 2001 from the internet at: <http://gamespot.com/gamespot/stories/news/0,10870,2446504.html>.

Jim Fedor, et al. Links 386 CD Players Manual, 1995, Access Software Inc.

Japanese Patent Office, "Office Action", mailed Jun. 14, 2005, for the corresponding Japanese Patent Application No. 2001-62195, 5 pages.

* cited by examiner

FIG. 6
| SIZE / SHAPE | b1 | b2 | b3 | b4 |
|---|---|---|---|---|
| a1 | 131  | 132  | 133  | 134  |
| a2 | 135  | 136  | 137  | 138  |
| a3 | 139  | 140  | 141  | 142  |
144

TEXTURE MAPPING METHOD, RECORDING MEDIUM, PROGRAM, AND PROGRAM EXECUTING APPARATUS

BACKGROUND OF THE INVENTION

1. Field of the Invention

The present invention relates to a texture mapping method, a recording medium, a program, and a program executing apparatus which make it possible to easily map a texture such as a light point texture indicative of a light, for example, on an image (video image) generated by a three-dimensional computer graphics (CG) technique or the like.

2. Description of the Related Art

A conventional technique for mapping a texture such as a light point texture onto an image (video image) generated by a three-dimensional computer graphics technique will be described with reference to a flowchart shown in FIG. 12.

Processes shown in the flowchart are performed by executing a three-dimensional modeling application program installed in a personal computer (hereinafter simply referred to as the PC).

Firstly, a desirable three-dimensional model is generated by the PC in step S1.

Then, a plurality of different light point textures are also generated by the PC in step S2.

Next, a process of mapping a light point texture onto the three-dimensional model generated in step S1 (texture mapping process) and a process of confirming the texture mapping process are performed in steps S3$a$ through S3$d$ of step S3.

Specifically, in step S3$a$, the three-dimensional model and the light point textures are displayed on a monitor as a display. A user selects a desirable light point texture to be mapped onto the three-dimensional model from the light point textures. Then, the user inputs data indicative of a position (coordinates) for mapping the selected light point texture onto the three-dimensional model, and data (RGB numeric values) indicative of a color of the selected light point texture, using a keyboard or the like.

Then, in step S3$b$, a rendering process, i.e., the texture mapping process is performed by mapping the light point texture generated in step S2 onto the three-dimensional model based on the position (coordinate) data and the color data.

Next, in step S3$c$, a video image generated in the rendering process is displayed on the monitor.

In step S3$d$, the user visually confirms whether the generated video image is suitable or not. If the generated video image is not suitable, that is, if the color or the mapping position of the light point texture is not suitable, control passes back to step S3$a$. In step S3$a$, the user inputs data again for adjusting the position and the color of the light point texture (numeric value correcting operation).

In this manner, the light point texture mapping process and the confirmation process thereof in step S3 are repeated until the user visually confirms that the generated video image is suitable in step S3$d$.

However, in the conventional method of mapping a light point texture as described above, the position of the light point can not be confirmed until the video image generated in the rendering process in step S3$b$ is actually displayed on the screen of the monitor.

Further, it is necessary to input numeric data or corrected numeric data indicative of a desirable position (coordinates) on the three-dimensional model for each light point using the keyboard or the like. Therefore, when there are many light points, a large amount of time is required for data inputting operation.

Further, when a realistic image of stars in the sky or a night view of a large city is to be drawn by the light texture mapping process, hundreds of, hundreds of thousands of light point textures are required. However, conventionally, such a large number of light point textures can not be processed in a frame time, i.e., 1/60 sec., for example, owing to the limited capability of hardware.

As described above, according to the light point texture mapping method of the conventional technique, excessively large amount of effort and time are required for designating many light points on a three-dimensional model. Further, the number of textures used for mapping is limited owing to the limited capability of hardware.

SUMMARY OF THE INVENTION

The present invention has been made taking the above problems into account, and an object of which is to provide a texture mapping method, a recording medium, a program, and a program executing apparatus for making it possible to easily map a texture of a light point or the like on a three-dimensional model.

A texture mapping method as a three-dimensional graphics technique according to the present invention comprises the steps of:

designating a three-dimensional model having polygons to be subjected to a texture mapping process;

designating a texture used for the texture mapping process; and transforming the polygons by perspective transformation and performing the texture mapping process by mapping the designated texture onto respective vertices of the transformed polygons.

A recording medium according to the present invention stores data indicative of an instruction to map a texture onto respective vertices of polygons constituting a three-dimensional model.

The recording medium of the present invention stores a program comprising the steps of:

confirming the presence of data indicative of an instruction to map a texture onto respective vertices of polygons constituting a three-dimensional model;

transforming the polygons by perspective transformation and performing the texture mapping process by mapping the designated texture onto respective vertices of the transformed polygons, if the presence of instruction data is confirmed.

A program executing apparatus according to the present invention comprises:

means for designating a three-dimensional model having polygons to be subjected to a texture mapping process; and means for designating a texture to be mapped onto respective vertices of the polygons in the texture mapping process.

According to the present invention, it is possible to designate a texture to be placed (drawn) onto respective vertices of polygons constituting a three-dimensional model. Therefore, it is possible to automatically map the designated texture onto the three-dimensional model.

According to the present invention, when only one type of a texture is mapped, or when all three-dimensional models in the screen are designated at a time for performing the texture mapping process, it is possible to designate the texture by the texture designating means, i.e., in the texture designating step before designating the three-dimensional models by the three-dimensional model designating means, i.e., in the three-dimensional model designating step.

Further, according to the present invention, attributes of a color of a texture to be mapped on respective vertices can be designated. That is, it is possible to automatically designate the attributes of the texture such as a color and a transparency.

Further, the texture used for the texture mapping process is not limited to the light point texture. It is possible to use various textures such as a leaf, a piece of cloud, and a fluff of a dandelion for the mapping process by designating a suitable color.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a view showing contents of a light point texture table;

DESCRIPTION OF THE PREFERRED EMBODIMENT

An embodiment of the present invention will be described with reference to drawings.

Figure 1:
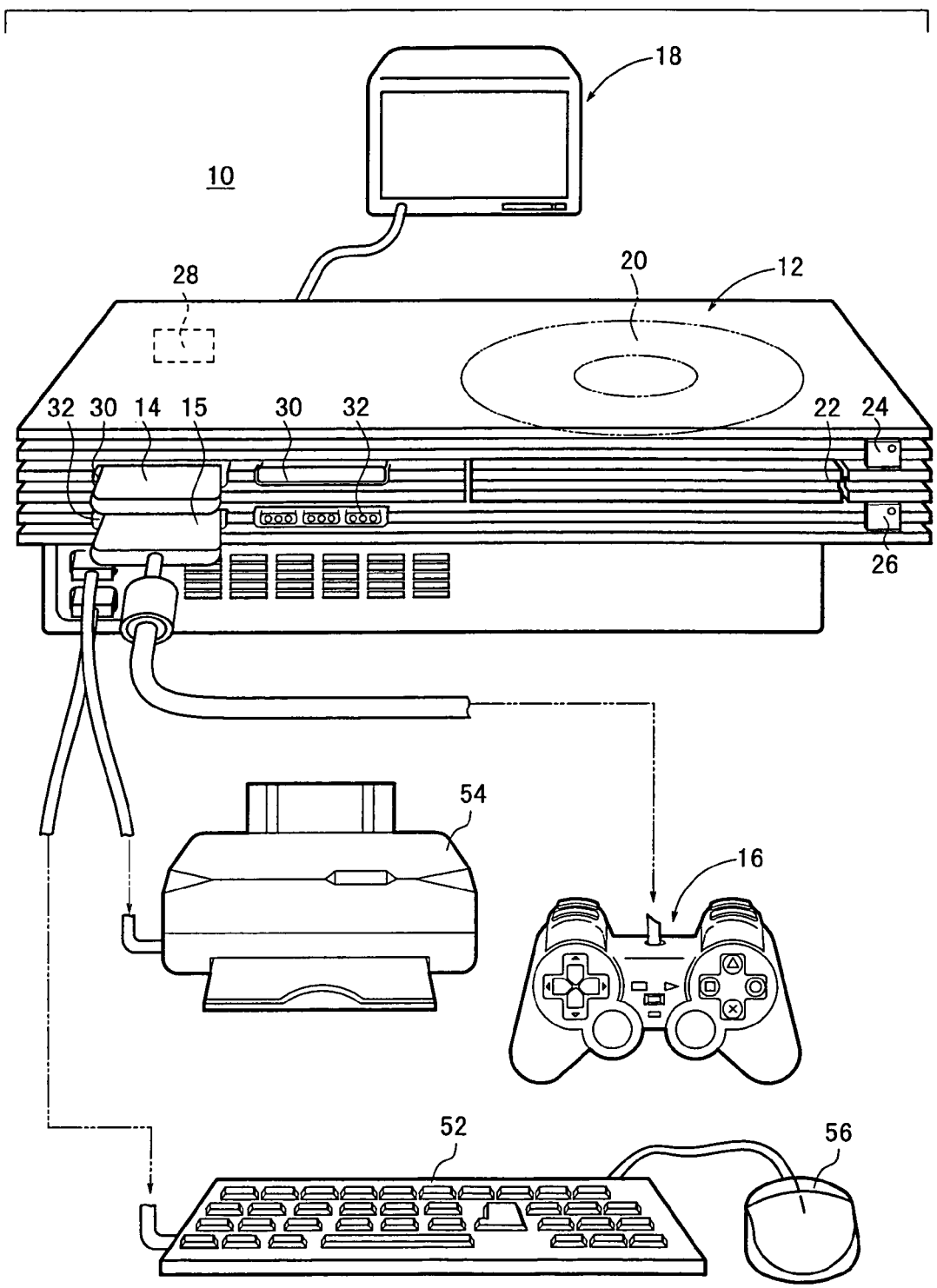
FIG. 1 is a view showing an arrangement of a system for executing and developing a program (program executing system) according to an embodiment of the present invention.

FIG. 1 schematically shows a system for executing and developing a program (hereinafter simply referred to as the program executing system 10) according to the embodiment of the present invention.

As shown in FIG. 1, the program executing system 10 basically comprises an apparatus 12 as a main component for executing and developing a program (hereinafter simply referred to as the program executing apparatus 12), a memory card 14 detachably connectable to the program executing apparatus 12, a manual controller 16 detachably connectable to the program executing apparatus 12 via a connector 15, a keyboard 52 and a mouse 56 constituting a manual input device for inputting data such as commands and decisions of a user, a color printer 54 as an image outputting apparatus, and a monitor 18 as a color display. The program executing apparatus 12 can be used as an entertainment system for executing various programs and outputs audio signals and video signals to the monitor 18.

In FIG. 1, the program executing apparatus 12 has a shape like stacked boxes (upper planar box and lower planar box). On the front side, the program executing apparatus 12 is equipped with a disk tray 22 as a disk loading unit for installing a recording medium such as an optical disk 20 for storing programs and data, a reset switch 24 for arbitrarily resetting a program which is currently executed, an eject button 26 for opening a disk tray for placing or removing the optical disk 20, two slots 30 for inserting a memory card 14, and two connection terminals (controller ports) 32 for inserting a connector of the manual controller 16, and a USB ports for connection to the key board 52, the color printer 54 or the like.

On the back side, the program executing apparatus is equipped with a power switch 28, an unillustrated output terminal (AV MULTI OUT) connectable to an AV cable for outputting image and sound to the monitor 18 via the AV cable. The keyboard 52 has USB interfaces for connection to the program executing apparatus 12 and the mouse 56.

The program executing apparatus 12 may be used as an entertainment system for executing a computer game program (video game program) stored in a recording medium (the optical disk 20) such as a CD-ROM and a DVD-ROM. Therefore, the program executing apparatus 12 has a control function for reading and executing the program and data in the optical disk 20 for displaying images of characters and game scenes on the monitor 18. Further, the program executing apparatus 12 has a control function for playing back movie data of DVDs and music data of CDDA (compact disk digital audio). In addition, the program executing apparatus 12 has a control function for executing a program obtained via a communication link such as a network communication. The program executing apparatus 12 successively generates images of three-dimensional computer graphics and displays the generated images on the monitor 18 as a display by executing a program.

With the control functions, the program executing apparatus 12 processes manipulation signals inputted from control buttons and control keys of the manual controller 16 to reflect such manipulation signals for moving a character or changing a game scene on the screen of the monitor 18, for example.

Figure 2:
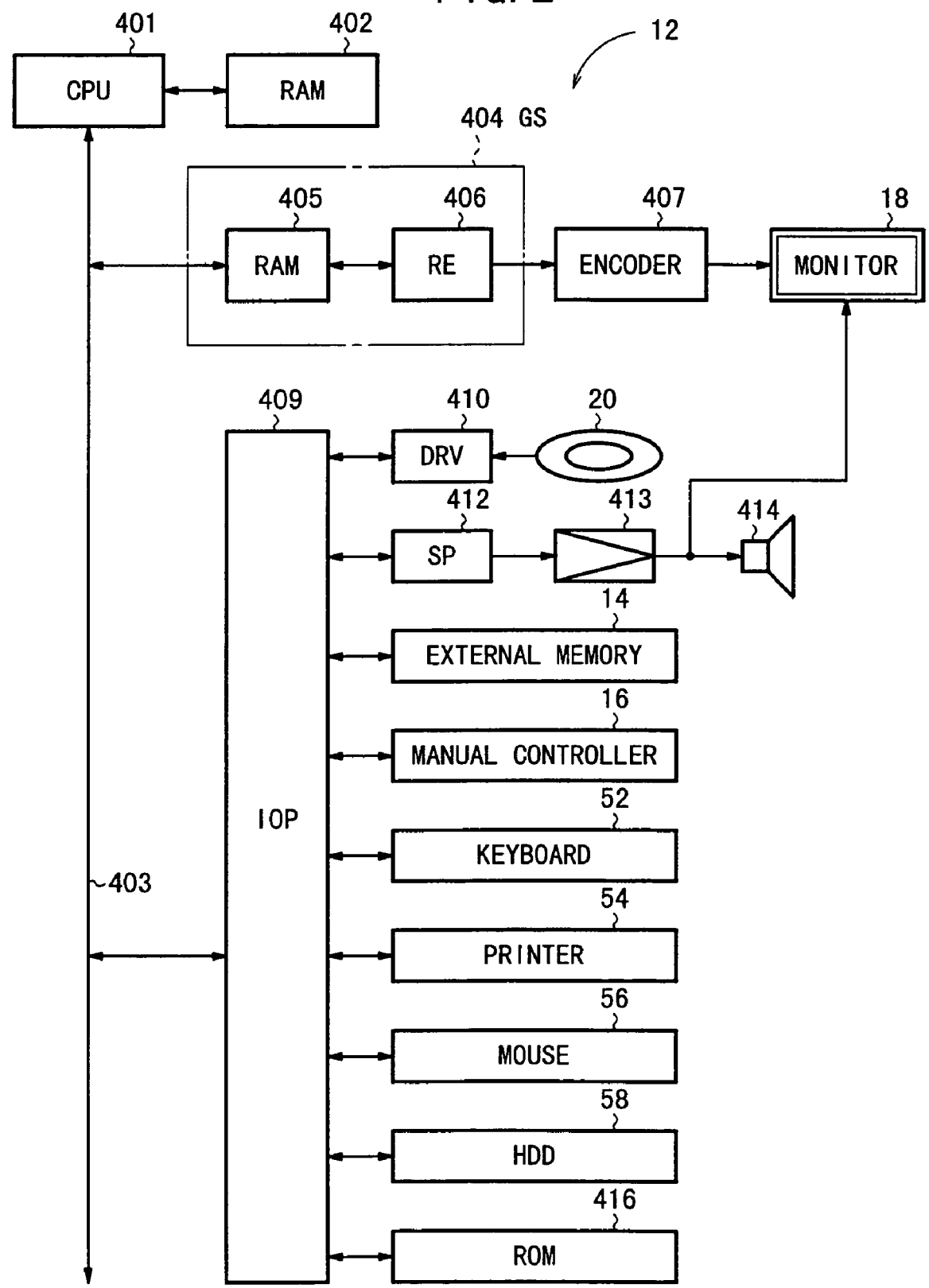
FIG. 2 shows a block diagram of the program executing system.

Next, a circuit arrangement of the program executing system 10 shown in FIG. 1 and general operation thereof will be described with reference to a block diagram shown in FIG. 2.

The program executing apparatus 12 comprises a CPU 401 as a core, and a RAM (semiconductor memory) 402 connected to the CPU 401 via a bus 403. Further, the program executing apparatus 12 comprises a graphic synthesizer (GS) 404 and an input output processor (IOP) 409. The GS 404 and the IOP 409 are connected to the CPU 401 via the bus 403. The GS 404 comprises a RAM 405 including a frame buffer, a z-buffer, and a texture memory, and also comprises a rendering engine (RE) 406 having a rendering function for drawing an image in the frame buffer of the RAM 405.

The GS 404 as constructed above is connected to the monitor 18 as an external device via an encoder 407 for converting digital RGB signals into standard TV signals in NTSC format, for example. When the program executing apparatus 12 is used for developing a program, it is preferable that the monitor 18 is capable of directly processing digital RGB signals and displaying high quality images in high resolution.

The IOP 409 is connected to an optical disk drive (DRV) 410 for reading data recorded in the optical disk 20 and decoding the read data, a sound processor (SP) 412, the memory card 14 as an external memory such as a flash memory, the manual controller 16, the keyboard 52, the color printer 54, the mouse 56, a hard disk drive (HDD) 58 comprising a hard disk for storing a three-dimensional modeling application program, a ROM 416 for storing an operating system or the like. The SP 412 supplies audio signals to the speaker 414 as an external device and/or the monitor 18 connected to the SP 412.

The memory card 14 is an external storage device comprising a CPU or a gate array, and a flash memory. The memory card 14 is detachably connectable to the slots 30 of the program executing apparatus 12. The memory card 14 is used for storing (saving) game data and a program such as a DVD player program (DVD driver).

The manual controller 16 has a plurality of control buttons for inputting commands (two-valued commands and multi-valued commands) from a user to the program executing apparatus 12. The optical disk drive 410 is equipped with a decoder for decoding images encoded in the standard MPEG (moving picture experts group) format.

The CPU 401 is operated at a clock frequency (clock speed) of 300 MHz, and has a three-dimensional computer graphics geometric transformation capability for rendering 66 million polygons per second.

The GS 404 comprises the RAM (DRAM) 405 and functions as a parallel rendering processor operated at a clock frequency of 150 MHz. The GS 404 utilizes RGB (24 bits), Alpha (8 bits) and z-buffer (32 bits) for pixel configuration. The z-buffer is used for automatically performing hidden surface removal or the like. Further, the GS 404 has functions for performing texture mapping, alpha blending, bi-linear filtering, tri-linear filtering or the like. The GS 404 is capable of rendering 75 million polygons per second.

Next, the mechanism of displaying a three-dimensional image on the monitor 18 according to commands from the manual controller 16 will be described. It is assumed that object data such as polygon vertex data and texture data recorded in the optical disk 20 is read by the optical disk drive 410 and stored in the RAM 402. The object data stored in the RAM 402 is processed by the CPU 401.

When an instruction of a user (player) is inputted to the program executing apparatus 12 via the manual controller 16, the CPU 401 calculates a three-dimensional position (coordinates) of an object (three-dimensional object) and a direction of the object toward a viewing position (viewpoint). Thus, polygon vertex data defined by coordinates of three orthogonal axes (X, Y, and Z axes) is updated. The updated polygon vertex data is transformed into two-dimensional coordinate data by perspective transformation for drawing so called a polygon designated by the two-dimensional coordinate data on the screen.

The transformed two dimensional data, z data, and texture data are supplied to the GS 404. Then, the GS 404 performs rendering based on the transformed two-dimensional data, z data to successively generate images as image data to be drawn (stored) in a memory, i.e., the RAM 405 (frame buffer). The image data for one frame generated in the rendering process is encoded by the encoder 407, supplied to the monitor 18, and displayed as an image.

Figure 3:
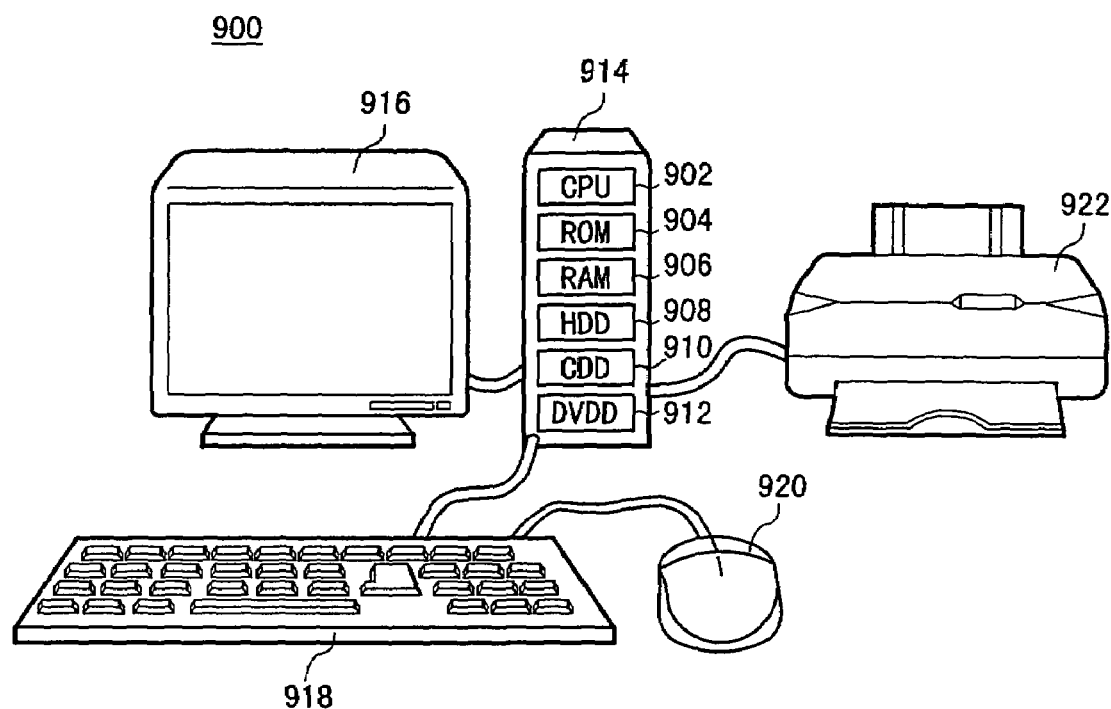
FIG. 3 shows a system of a personal computer including a hard disk in which a three-dimensional modeling application program is installed.

FIG. 3 shows a personal computer system (PC) 900. The PC 900 comprises a main body (case) 914 for enclosing a CPU 902 as control means, a ROM 904, a RAM 906, a hard disk drive (HDD) 908, CD drive (CDD) 910 for reading a CD-ROM or the like, and DVD drive for reading a DVD-ROM or the like. Further, the PC 900 comprises a monitor 916, a keyboard 918, a mouse 920, a color printer 922 which are connected to the main body 914. A three-dimensional modeling application program for generating three-dimensional models is installed in a hard disk in the HDD 908 of the PC 900.

As the three-dimensional modeling application program installed in the HDD 908, software widely known as "MAYA" sold by Alias|Wavefront, a division of Silicon Graphics Limited can be used, for example. The three-dimensional modeling application program is a tool for generating three-dimensional graphics.

The three-dimensional modeling application program has a wire-frame displaying function, a camera setting function, and a rendering function for easily generating a three-dimensional model as an object using the mouse 920, keyboard 918 or the like.

Generally, three-dimensional models (three-dimensional modeling data) such as a character object and a building object are generated on the PC 900 by a graphics designer. Then, the three-dimensional models (three-dimensional modeling data) generated by the designer is used by a programmer for developing a game program on the above-described program executing system 10, and, if necessary, on the PC 900. The three-dimensional modeling data generated on the PC 900 is converted into data for use of the program executing system 10, i.e., data supported by the program executing system 10. The converted data is supplied to the program executing system 10 via a recording medium (the optical disk 20 such as a CD-R media, a DVD-RAM). Alternatively, the converted data is supplied to the program executing system 10 via a network. For example, the PC 900 can be connected to the program executing system 10 via a LAN.

Figure 4:
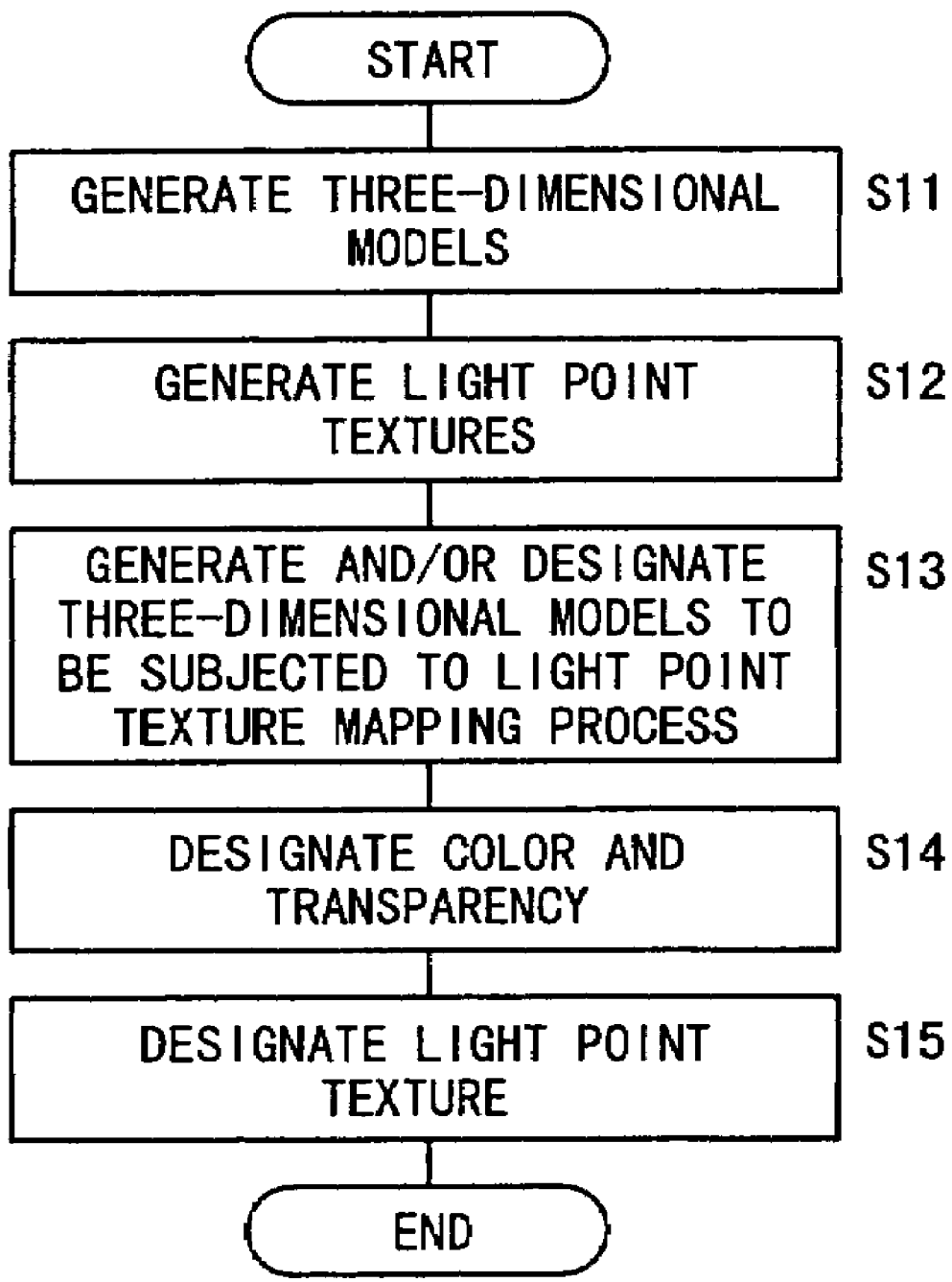
FIG. 4 is a flowchart showing a processing sequence of a texture mapping operation.

The program executing system 10 and the PC 900 are basically constructed and operated as described above. Next, a texture mapping function of the program executing system 10 and the PC 900 will be described with reference to a flowchart shown in FIG. 4.

In the present embodiment, a light point (light emitting point) texture is used as the texture for mapping. However, it is possible to use textures of any suitable materials such as a leaf, a piece of cloud, and a fluff of a dandelion by setting a suitable color (RGB values), a transparency, or the like.

In the mapping function as described later on, routines (programs) in steps S12 through S15, and S21 in the flowchart can be stored in the HDD 58 as libraries used for general purpose.

Figure 5:
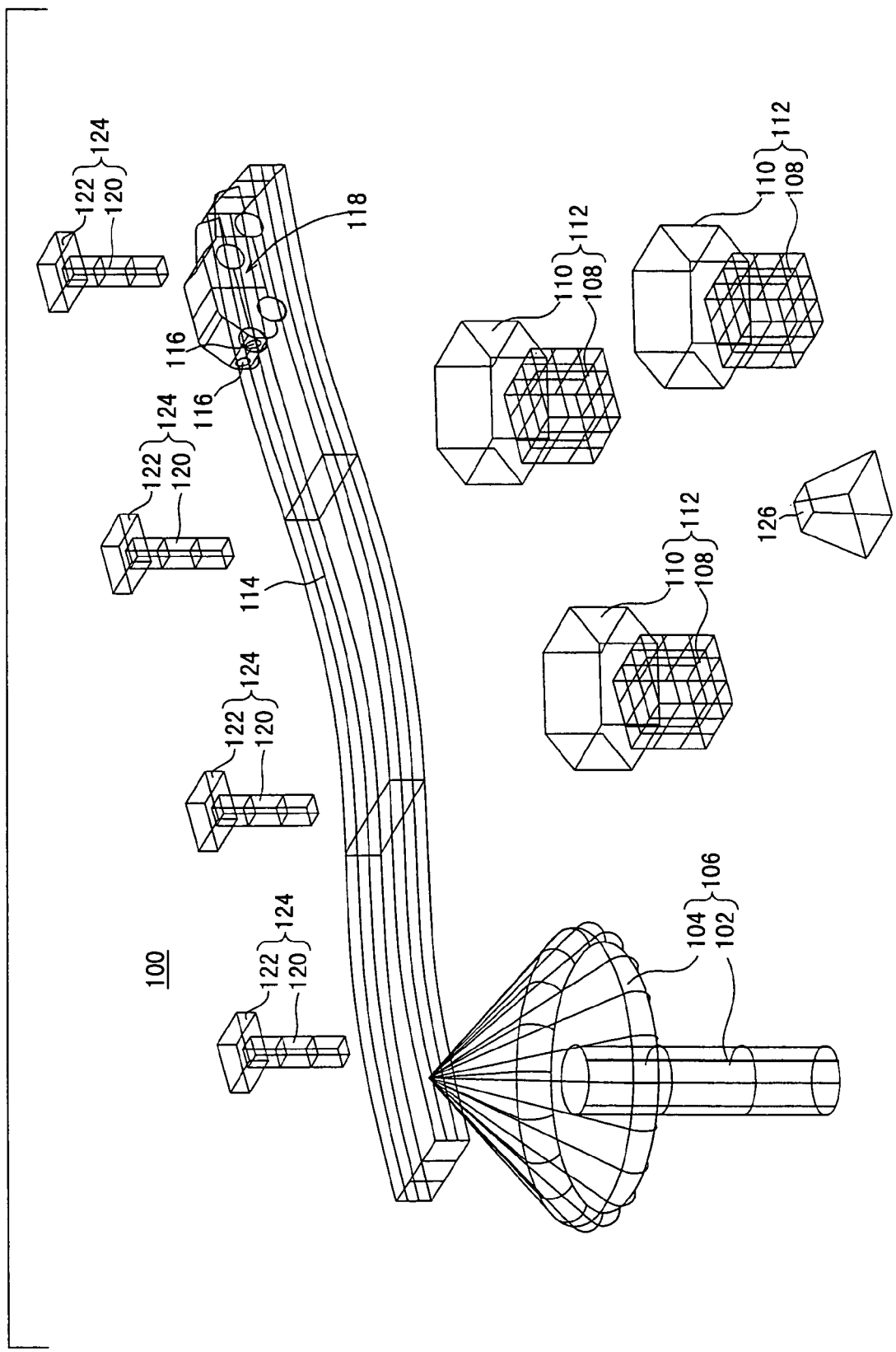
FIG. 5 is a schematic view showing three-dimensional wire-frame models.

Firstly, in step S11, desired three-dimensional models (three-dimensional modeling data) are generated on the PC 900. FIG. 5 schematically shows the generated three-dimensional models (wire-frame models) 100.

In FIG. 5, a building model 106 comprising a pillar model 102 and a conical roof model 104, building models 112 each comprising a lower cubic model 108 and an upper hexagonal block model 110, a road model 114, a car model 118 having tail light models 116, illumination lamp models 124 each comprising a pole model 120 and a light model 122, and a building model 126 in a shape of a pyramid are shown as the three-dimensional models 100. Coordinates (x, y, z) corresponding to each vertex of polygons of three-dimensional models (wire frame models) 100 are automatically calculated by the three-dimensional modeling application program.

In step S12, various types of light point textures are generated on the PC 900 or the program executing apparatus 12. In the present embodiment, it is assumed that the light point textures are generated on the program executing apparatus 12.

FIG. 6 is a light point texture table 144 schematically showing the various types of light point textures generated on the program executing apparatus 12. As shown in the light point texture table 144, three shapes, i.e., (circular shape a1, lozenge shape a2, star shape a3) and four sizes (b1, b2, b3, b4) of light point textures 131–142 can be generated in the present embodiment. The light point texture table is stored as texture memory means in a predetermined memory area in the HDD 58.

Then, in step S13, three-dimensional models to be subjected to a light point texture mapping process are generated and/or designated. That is, in step S13, three-dimensional models comprising polygons having vertices to be subjected to the texture mapping process are designated. In the texture mapping process, a light point texture is placed, (drawn, or mapped) onto each of predetermined vertices of polygons as described later on.

Specifically, the three-dimensional models 100 shown in FIG. 5 and the light point texture table 144 shown in FIG. 6 are displayed on the screen of the monitor 18. In step S13, the user is requested to select (designate) three-dimensional models (MA) to be subjected to the texture mapping process by left-clicking the mouse 56, for example, from the building model 106 (the pillar model 102 and the conical roof model 104), the building models 112 (the lower cubic models 108 and the upper hexagonal block models 110), the road model 114, the car model 118 (the tail light models 116), the illumination lamp models 124 (the pole models 120 and the light models 122), and the building model 126. The user may designate an entire three-dimensional model such as the building model 106. Alternatively, the user may designate a component of a three-dimensional model such as the pillar model 102. If the user designate a desired three-dimensional model MA by lift-clicking the mouse 56 when a cursor (not shown) is positioned on the desired three-dimensional model MA, the color of the designated three-dimensional model MA is changed from black into green, for example. In this manner, the user can designate three-dimensional models, or components of three-dimensional models using the mouse 56 or the like.

Since the color of the designated three-dimensional models MA is changed into green, the user can easily identify the designated three-dimensional models MA at a glance on the screen.

It is to be understood that the user may designate all the three-dimensional models to be subjected to the texture mapping process at a time if such an option is selected from the menu.

Figure 8:
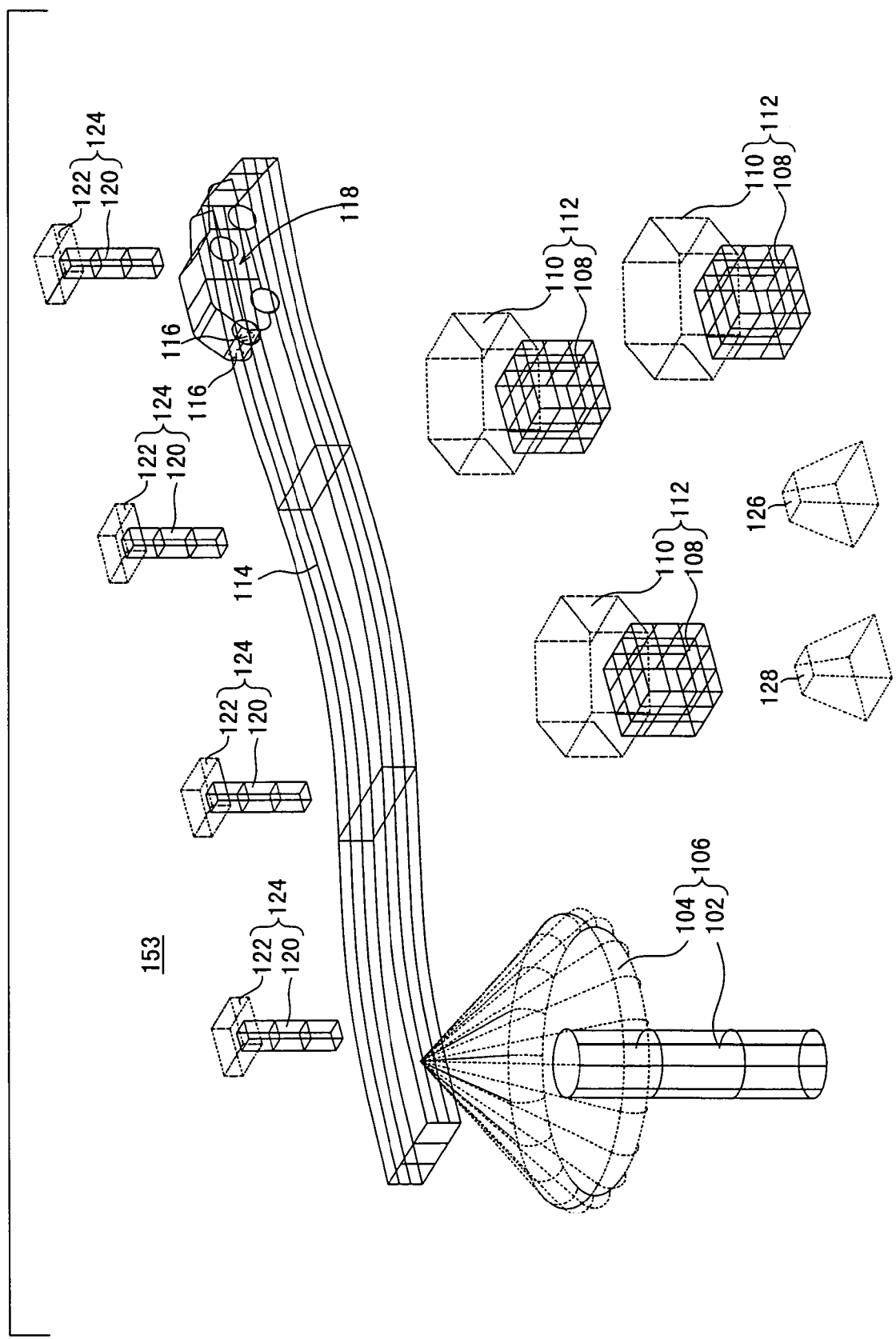
FIG. 8 is a view showing three-dimensional models after designation for a texture mapping process is completed.

FIG. 8 is an image 153 on the monitor 18 showing a state after three-dimensional models MA to be subjected to the light point texture mapping process are designated.

In FIG. 8, the three-dimensional models MA designated to be subjected to the light point texture mapping process by clicking of the mouse 56, i.e., the conical roof model 104, the upper hexagonal block models 110, the tail light models 116, the light models 122, and the building model 126 are shown in dotted lines. According to the present embodiment, the three-dimensional models MA are displayed in green on the monitor 18.

The remaining three-dimensional models MB (three-dimensional models 100=three-dimensional models MA+three-dimensional models MB) which are not designated to be subjected to the light point texture mapping process, i.e., the pillar model 102, the lower cubic models 108, the road model 114, the car model 118, and the pole models 120 are displayed in solid lines. The three-dimensional models MB are displayed in black on the monitor 18.

That is, the three-dimensional models MA having polygon vertices on which the light point texture needs to be (placed) mapped in the light point texture mapping process are displayed in dotted lines in green, and the three-dimensional models MB having polygon vertices on which the light point texture need not to be mapped in the light point texture mapping process are displayed in solid lines in black in the image 153 on the monitor 18. The three-dimensional models MA and the three-dimensional models MB can be displayed in the same manner on the monitor 916 of the PC 900.

In FIG. 8, two pyramidical building models 126, 128 are displayed. The left pyramidical building model 128 is newly generated and designated as the three-dimensional model MA to be subjected to the light point texture mapping process in step S13. Programs for enabling a function of copying the three-dimensional models or the like are installed in the HDD 58 of the program executing apparatus 12 and executable by the program executing apparatus 12.

As described above, in step S13, it is possible to newly generate new three-dimensional models MA and designate three-dimensional models MA from the existing three-dimensional models 100 for determining three-dimensional models to be subjected to the light point mapping process.

Figure 7:
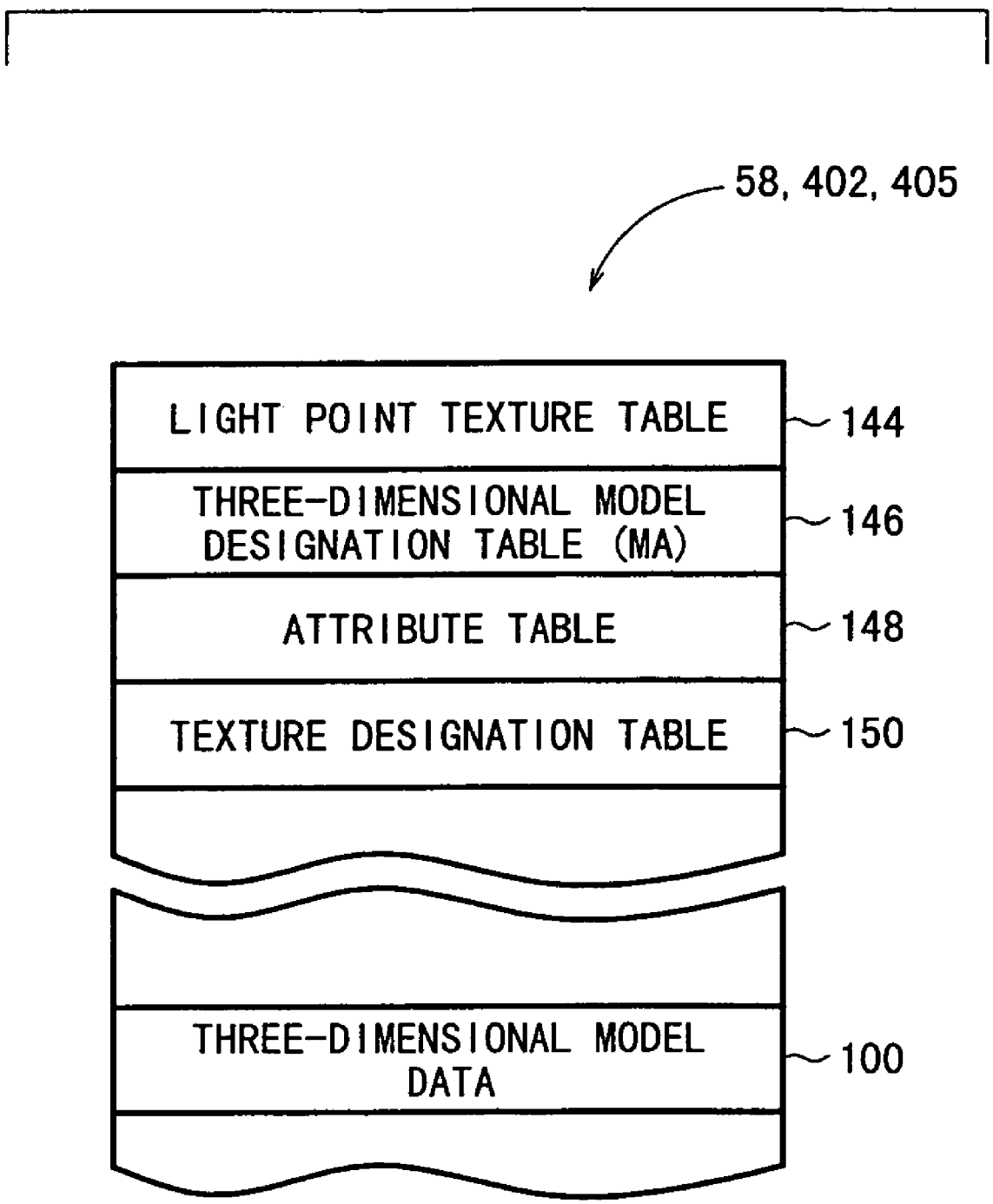
FIG. 7 is a view showing tables stored in a hard disk.

The three-dimensional models MA generated or designated in step S13 are stored in a predetermined memory area of the HDD 58, i.e., in a three-dimensional model designation table 146 shown in FIG. 7. That is, the three-dimensional model designation table 146 contains data indicative of polygons (vertices of polygons) which need to be subjected to the light point texture mapping process. Various items of data in the HDD 58 can be transferred to the RAM 402, and the RAM 405 if required during the progress of the game.

Then, in step S14, attributes such as a color (RGB values) and a transparency of the light point texture to be mapped on respective vertices of polygons constituting the three-dimensional models MA (the conical roof model 104, the upper hexagonal block models 110, the tail light models 116, the light models 122, the pyramidical building model 126, and the pyramidical building model 128) in the three-dimensional designation table 146 are designated. It is possible to designate such attributes to each of the three-dimensional models MA (the conical roof model 104, the upper hexagonal block models 110, the tail light models 116, the light models 122, the pyramidical building model 126, and the pyramidical building model 128) one by one. Alternatively, it is possible to designate the same attributes (for example, the same color and transparency) to all of the three-dimensional models MA at a time.

The relationship between the designated attributes and the three-dimensional models MA are stored as data in a predetermined memory area of the HDD 58, i.e., an attribute table 148. That is, the attribute table 148 contains data indicative of colors and transparencies of the light point textures to be mapped on the respective vertices of polygons constituting the three-dimensional models MA.

Then, in step S15, based on the light point texture table 144, a type ST of the light point texture to be mapped on the respective vertices of polygons constituting the three-dimensional models MA (the conical roof model 104, the upper hexagonal block models 110, the tail light models 116, the light models 122, the pyramidical building model 126, and the pyramidical building model 128) in the three-dimensional designation table 146 is designated from the light point textures 131–142. The type of the light point texture can be designated by selecting a shape (ai) from the shapes (a1–a3), and a size (bj) from the sizes (b1–b4) shown in FIG. 6. In practice, the type of the light point texture can be designated by clicking a desired light point texture from the light point textures 131–142 in the light point texture table 144 on the screen. The light point texture designated in this step can be defined as ST (ai, bj). Different types of the light point textures may be designated for the three-dimensional models MA. Alternatively, One type of the light point texture may be designated for all of the three-dimensional models MA.

In this case, desired one of the light point texture can be selected from the light point textures 131–142 as a default light point texture. In this manner, it is possible to designate the desired default light point texture selected from the light point textures 131–141 for all of the three-dimensional models MA at a time. That is, it is not necessary to separately designate a light point texture for each of the three-dimensional models MA one by one.

The relationship between the designated types of the light point textures and the three-dimensional models MA are stored as data in a predetermined memory area of the HDD 58, i.e., in a texture designation table 150 (see FIG. 7).

Figure 9:
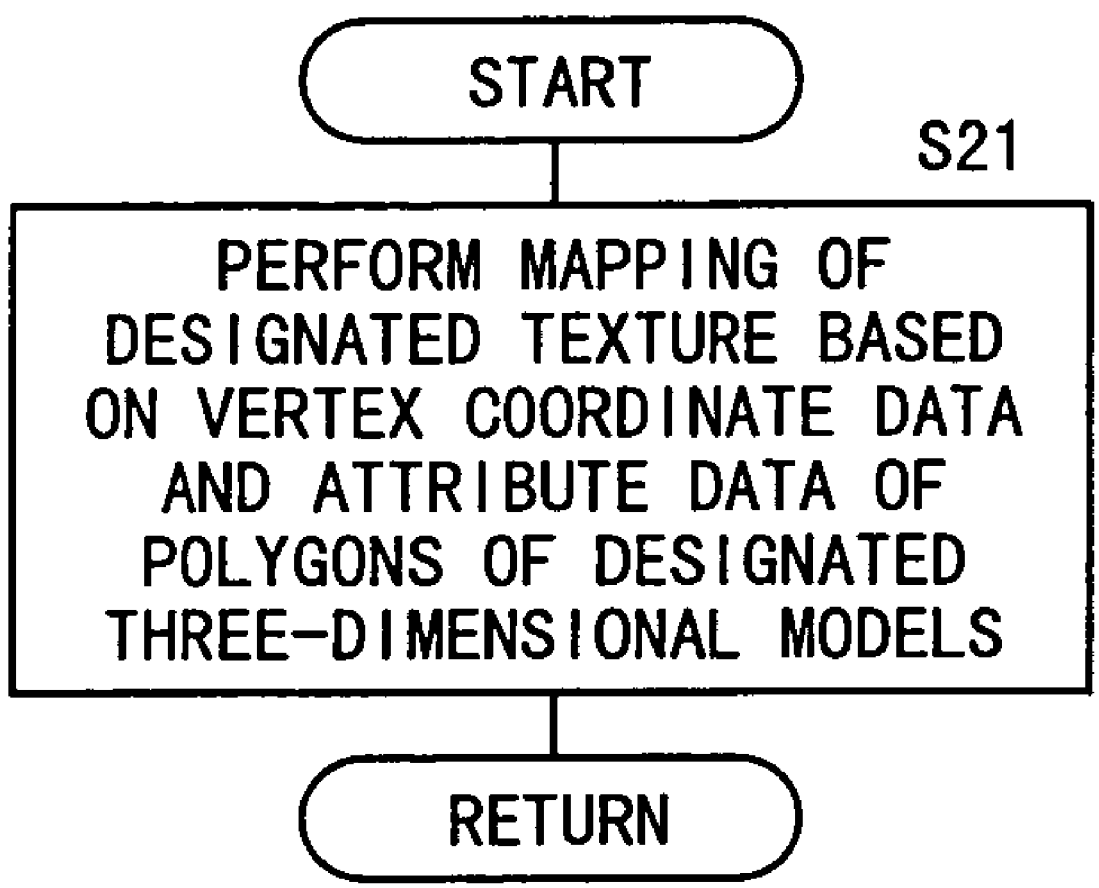
FIG. 9 is a view showing contents of a texture mapping program.

After the above preparatory processes in steps S11 through S14, the texture mapping process is performed. The respective polygons defined by three-dimensional coordinates constituting the three-dimensional models 100 are subjected to perspective transformation and converted into polygons defined by two-dimensional coordinates for generating an image on the screen. Then, in step S21 of FIG. 9, polygons constituting the designated three-dimensional models MA are subjected to the texture mapping process. That is, the CPU 401 and the GS 404 execute a texture mapping program for mapping a designated texture onto each vertex of polygons of the three-dimensional model MA based on the vertex position data (coordinate data) and the attribute data of the polygons. The texture mapping program in step 21 can be utilized as a library by the program executing apparatus 12.

Figure 10:
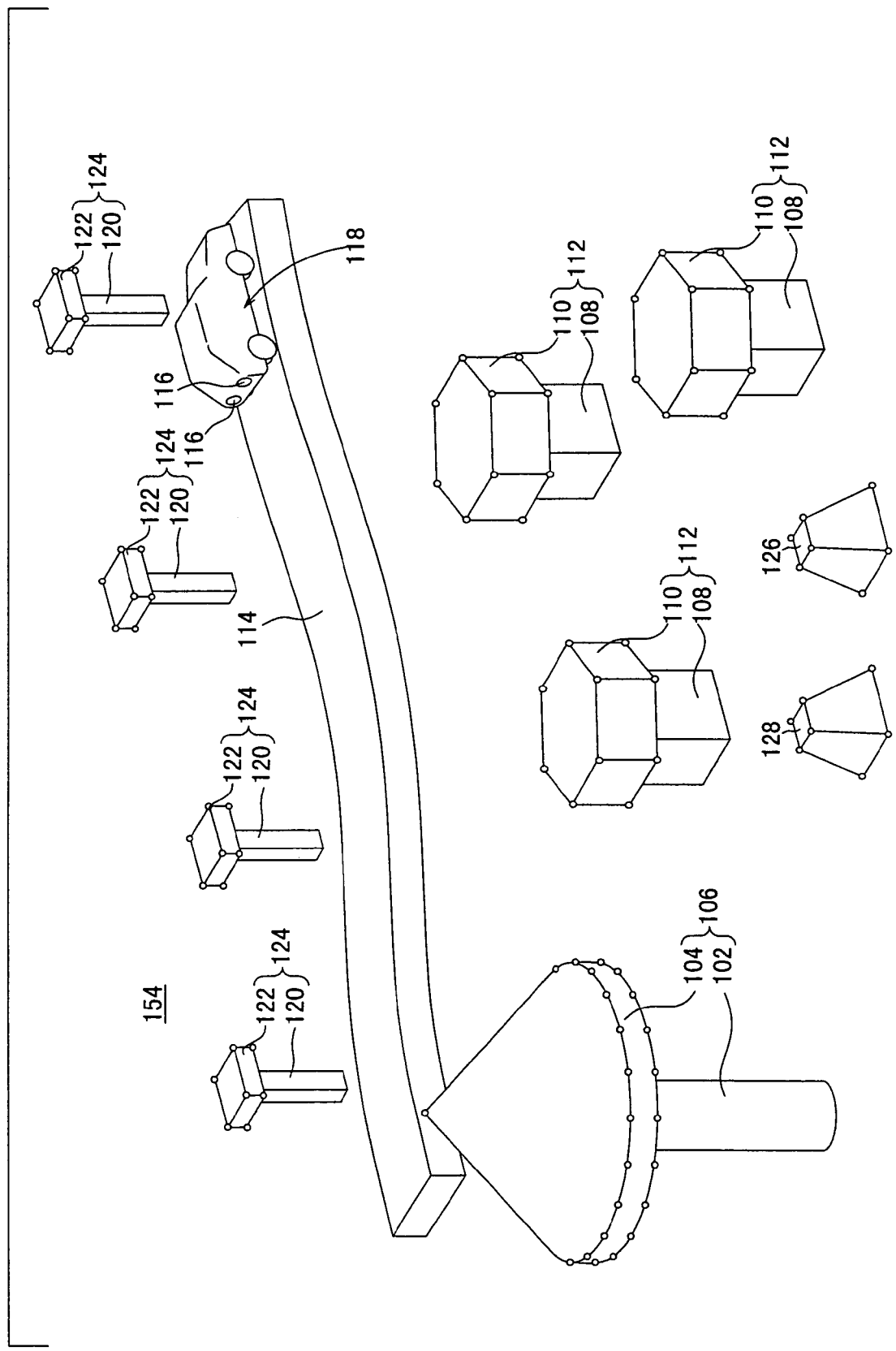
FIG. 10 is a view showing solid three-dimensional models after the texture mapping process is performed.

When the texture mapping program is executed, the CPU 401 and the GS 404 of the program executing apparatus 12, which also functions as an entertainment apparatus, perform a rendering process with the aid of the rendering engine 406 based on the respective data in the light point texture table 144, the three-dimensional model designation table 146, the attribute table 148, the texture designation table 150 (these data are read from the HDD 58 and temporarily stored in the RAM 402 and the RAM 405) for drawing an three-dimensional image 154 in FIG. 10 as three-dimensional solid models having light emitting points in the frame buffer of the RAM 405.

The three-dimensional image 154 drawn in the frame buffer is converted into video signals by the encoder 407 and displayed as a screen image on the monitor 18.

The three-dimensional image 154 shown in FIG. 10 includes the three-dimensional models designated in steps S13 through S15, i.e., the three-dimensional models MA (the conical roof model 104, the upper hexagonal block models 110, the tail light models 116, the light models 122, the pyramidical building model 126, and the pyramidical building model 128). The designated texture is mapped onto the respective vertices of polygons of the three-dimensional models MA in the designated color and the designated transparency.

The three-dimensional image in FIG. 5, the three-dimensional image 153 in FIG. 8, and the three-dimensional image 154 in FIG. 10 can be confirmed by still image capturing and outputting the captured images from the color printer 54 as color hard copies.

When an actual game program read from the optical disk 20 is executed, the CPU 401 generates an instruction list (so-called display list) indicative of a screen image to be displayed in the next frame on the monitor 18. The display list is successively updated and supplied to the GS 404.

Figure 11:
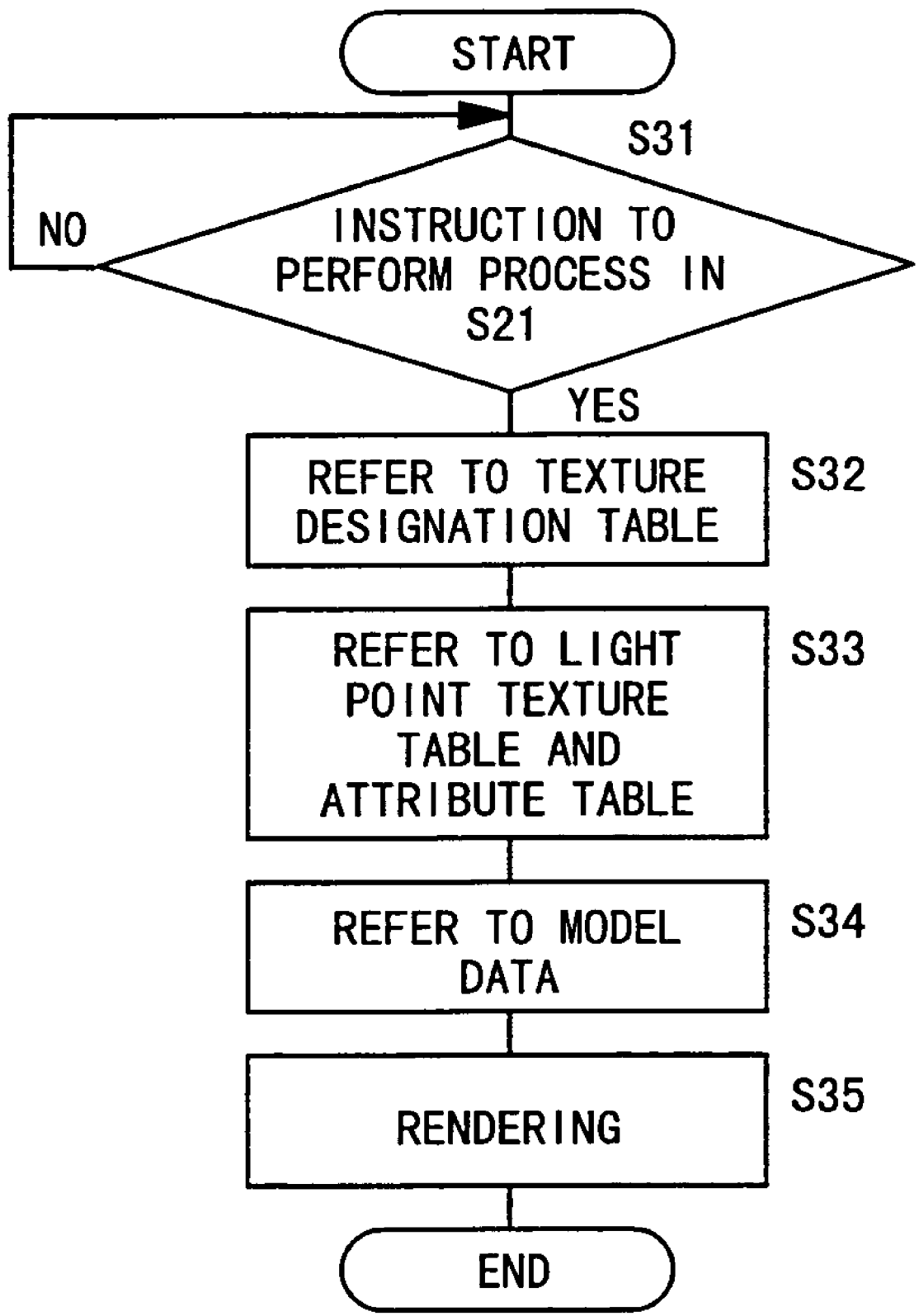
FIG. 11 is a flowchart showing a processing sequence of mapping a texture onto respective vertices of polygons of the designated three-dimensional models.
Figure 12:
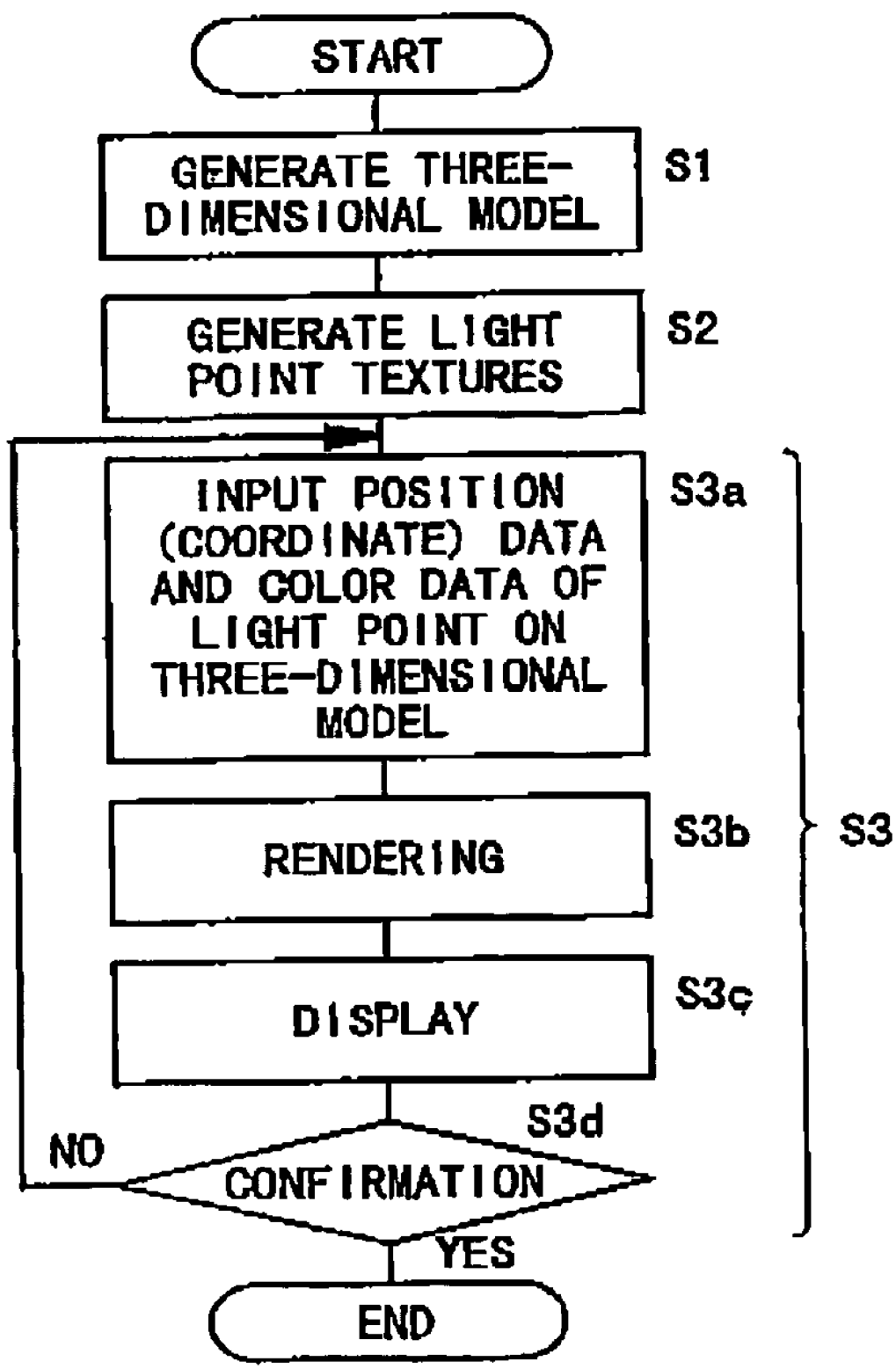
FIG. 12 is a flowchart used for explanation of a conventional technique.

As shown in a flowchart in FIG. 11, in step S31, the CPU 401 determines whether an instruction for performing the process in step S21 is included in the display list or not. If the CPU 401 determines that an instruction for performing the process in step S21 is included in the display list, then the CPU 401 instructs the GS 404 to refer to the texture designation table 150 containing data of relationship between three-dimensional models MA and the designated type ST of the light point texture in step S32.

The three-dimensional models 100 in FIG. 5 are subjected to the perspective transformation and stored as data in the RAM 405 (see FIG. 7).

Then, in step S33, the GS 404 refers to the light texture table 144 for drawing the designated type ST of the light point texture selected from the light point textures 131–142. At this time, the light point textures 131–142 are temporarily stored in the RAM 405. Further, the GS 404 refers to the attribute table 148 for obtaining data of the designated color and transparency.

In step S34, the GS 404 refers to the three-dimensional models 100 drawn in the RAM 405. Then, in step S35, the GS 404 maps the designated light point texture selected from the light point textures 131–142 onto respective vertices of polygons of the designated three-dimensional models MA in the designated color and the designated transparency. The texture mapping process according to the present embodiment is performed automatically in the steps as described above. In this manner, the rendering process is completed.

The three-dimensional image 154 in FIG. 10 is a screen image which is displayed after the rendering process is completed.

As described above, according to the present embodiment, the three-dimensional models 100 are generated using the three-dimensional modeling application program installed in the HDD 908 of the PC 900. Then, the tables containing data for mapping a desirable texture onto respective vertex of polygons selected from the three-dimensional model 100 are generated by the program executing apparatus 12. Accordingly, it is possible to visually and easily set coordinates and attributes of the light points (light point textures) to be mapped onto the vertices of the selected polygons.

That is, the desired three-dimensional models MA to be subjected to the texture mapping process can be selected (designated) from the three-dimensional models 100 by the program executing apparatus 12 for making it possible to perform the texture mapping process for all of the vertices of polygons constituting the designated three-dimensional models MA automatically. Therefore, it is possible to designate coordinates and attributes of hundreds of thousands of light points in one frame on the screen. Accordingly, the texture mapping technique can be suitably used for drawing images such as a night view of a large city, a view of the earth and the other stars seen from a spaceship, a night view of fireworks in a city, a night view of an amusement park, or the like.

Further, according to the above-described embodiment, the three-dimensional models MA to be subjected to the texture mapping process are designated by three-dimensional model designating means, i.e., in the three-dimensional model designating step (step S13). Then, the desired texture to be used in the texture mapping process is designated by texture designating means, i.e., in the texture designating step (step S15). Thereafter, the polygons of the three-dimensional models MA are transformed by perspective transformation and the texture mapping process is performed by mapping the designated texture onto respective vertices of the transformed polygons by the texture mapping means, i.e., in the texture mapping step (step S21). Further, the texture designating means may further comprises means for designating a color of a texture, i.e., the texture designating step (step S15) may further comprises the step of designating a color of a texture (step S14).

In this manner, the desired texture can be placed (drawn) on the respective vertices of the polygons constituting the three-dimensional models MA. Accordingly, it is made easier to map a large number of textures on the three-dimensional models 100.

Further, according to the present embodiment, the program comprises the steps of confirming the presence of data, i.e., the three-dimensional model designation table 146 indicative of an instruction to map a texture onto respective vertices of polygons constituting a three-dimensional model (S31, S32), and transforming the polygons by perspective transformation and performing the texture mapping process by mapping the designated texture onto the respective vertices of the transformed polygons (steps S32 through S35), if the presence of instruction data is confirmed.

By storing the program in a recording medium such as the optical disk 20, it is made easier to map a large number of textures on the three-dimensional models 100.

The present invention shall not be limited to the particular embodiment disclosed herein. It will be apparent to a person skilled in the art that numerous modifications and variation may be made without departing from the spirit and scope of the invention.

As described above, according to the present invention, it is possible to designate textures to be mapped onto vertices of polygons constituting three-dimensional models. Accordingly, it is possible to map the designated textures onto the three-dimensional models easily.

That is, according to the present invention, it is very easy to map textures such as light points onto three-dimensional models.

What is claimed is:

1. A method of mapping a texture for displaying a three-dimensional image on a monitor, said method being carried out by executing a program by an image processing apparatus having CPU, said method compromising the steps of:
    selecting a designated three-dimensional model from a plurality of three-dimensional models each formed by polygons by activating a pointing device when a cursor is positioned on the designated three-dimensional model; and
    mapping at a time a plurality of textures having identical shapes on respective vertices of said polygons of said selected three-dimensional model.

2. A method according to claim 1, wherein said mapping step comprises the step of selecting said plurality of textures.

3. A method according to claim 1, wherein said plurality of textures are light point textures, and said three-dimensional image displayed on said monitor includes light point textures mapped on respective vertices of said polygons of said designated three-dimensional model.

4. A method according to claim 1, further comprising the step of designating a color of said plurality of textures.

5. A method according to claim 1, further comprising the step of transforming said polygons by perspective mapping.

6. A recording medium storing said program for carrying out the method according to claim 1.

7. A recording medium according to claim 6, wherein said recording medium further stores data of said designated three-dimensional model and data of said designated texture.

8. An image processing apparatus having a CPU for executing a program to display a three-dimensional image on a monitor, said image processing apparatus comprising:
    means for selecting a designated three-dimensional model from a plurality of three-dimensional models each formed by polygons in response to activation of a pointing device when a cursor is positioned on the designated three-dimensional model; and
    means for mapping at a time a plurality of textures having identical shapes on respective vertices of said polygons of said selected three dimensional model.

9. An image processing apparatus according to claim 8, wherein said mapping means selects said plurality of textures.

10. An image processing apparatus according to claim 8, wherein said plurality of textures are light point textures, and said three-dimensional image displayed on said monitor includes light point textures mapped on respective vertices of said polygons of said designated three-dimensional model.

11. An image processing apparatus according to claim 8, further comprising the step of designating a color of said plurality of textures.

12. An image processing apparatus according to claim 8, further comprising the step of transforming said polygons by perspective mapping.

* * * * *